A. J. GRINDLE.
MELTING FURNACE.
APPLICATION FILED MAR. 3, 1922.

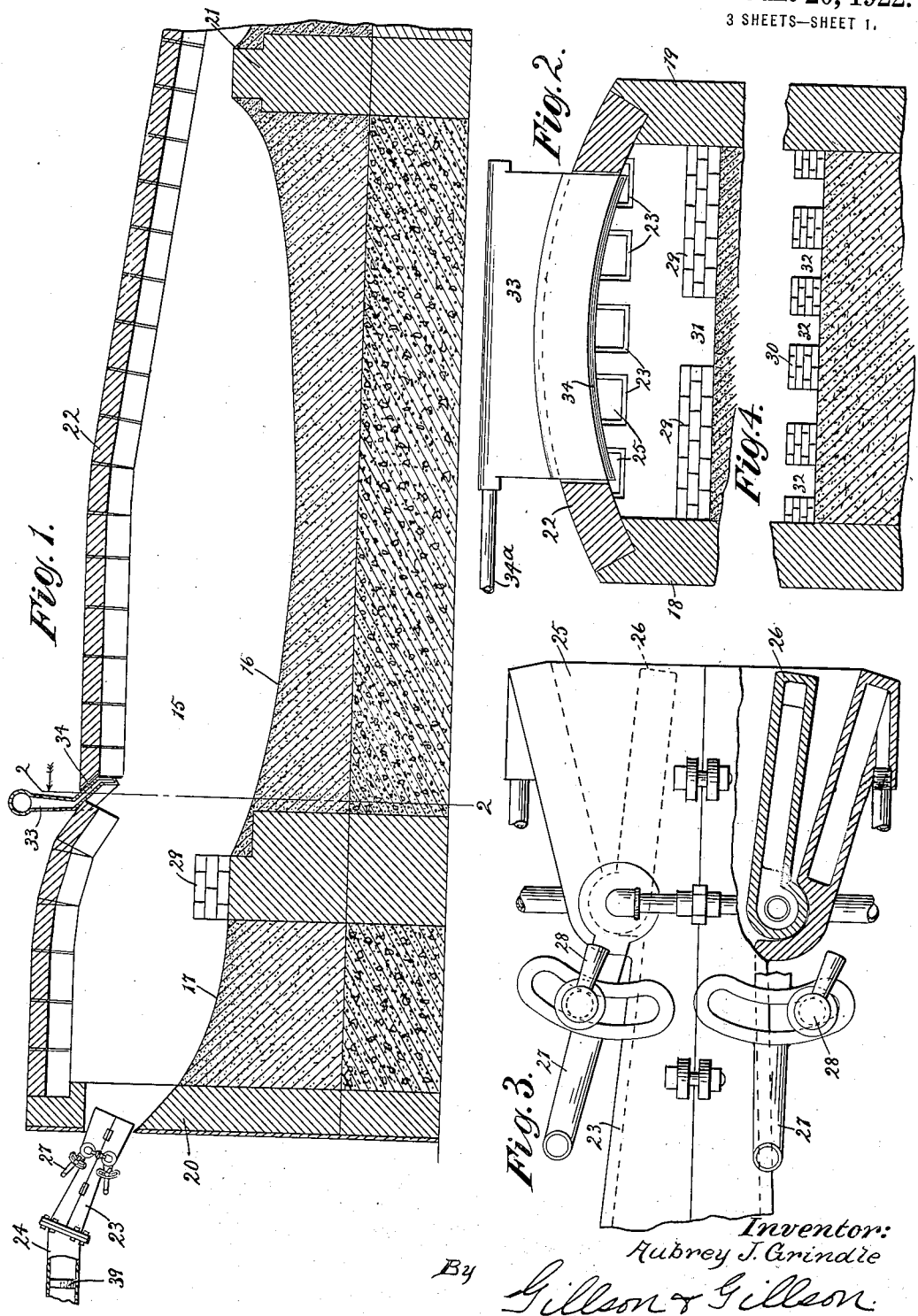

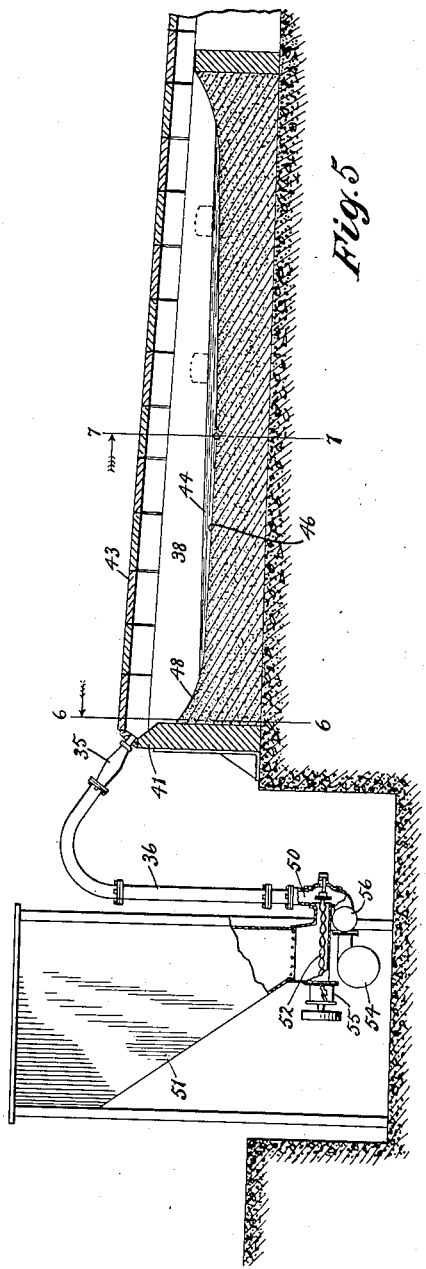

1,420,312.

Patented June 20, 1922.
3 SHEETS—SHEET 3.

Inventor.
Aubrey J. Grindle
By Gillson & Gillson
Attys.

UNITED STATES PATENT OFFICE.

AUBREY J. GRINDLE, OF CHICAGO, ILLINOIS, ASSIGNOR TO GRINDLE FUEL EQUIPMENT COMPANY, A CORPORATION OF ILLINOIS.

MELTING FURNACE.

1,420,312.　　　　　Specification of Letters Patent.　　Patented June 20, 1922.

Original application filed July 7, 1916, Serial No. 107,990. Divided and this application filed March 3, 1922. Serial No. 540,668.

*To all whom it may concern:*

Be it known that I, AUBREY J. GRINDLE, a citizen of the United States of America, and resident of Chicago, county of Cook, and State of Illinois, have invented certain new and useful Improvements in Melting Furnaces, of which the following is a specification and which are illustrated in the accompanying drawings, forming a part thereof.

The invention relates to metallurgical furnaces and especially to so-called malleable iron melting furnaces, the object of the invention being to provide an improved furnace adapted for the use of powdered coal as fuel for melting the iron from which malleable castings are produced. In previous attempts to melt malleable iron with powdered coal difficulty has been experienced in bringing the bath to the desired temperature without large losses of material by oxidation or the use of an excessive amount of fuel. Furthermore, while powdered coal melting furnaces have been proposed, it has been assumed that the provision of a separate combustion chamber having refractory walls was necessary for maintaining ignition of the flame, especially during the early stages of the operation, and the results obtained with these furnaces have been unsatisfactory. Among the features of these furnaces now believed to be unfavorable and which it is proposed to avoid are the development of the highest temperatures in the combustion chamber, rather than in the hearth chamber, where the melting and conditioning of the bath are to be accomplished, the difficulty of maintaining the masonry walls of the combustion chamber at the high temperatures attained therein, the accumulation of the melted fuel ash in the combustion chamber, and, in some cases, the introduction of the combustible mixture of air and fuel at an excessive velocity and the impossibility of properly directing the flame upon the charge.

The present invention contemplates a powdered coal melting furnace having burners directly entering the chamber containing the hearth, and preferably in such manner as to cause the flame to impinge obliquely upon the bath, when melted, at the adjacent edge of the hearth. A circulating motion is thus imparted to the melted bath which insures that all parts of the same will be quickly brought to a high temperature. On the other hand, ignition of the flame during the early stages of the operation is satisfactorily maintained by the exposure of a part of the masonry floor of the furnace chamber adjacent the burners while the charge of metal is in the cold, and therefore solid state, with the additional provision, if desired, of masonry piers which rise into the path of the flame without materially obstructing the furnace chamber to the movement of the flame therethrough. In any case the furnace chamber expands immediately or quite abruptly in size from the plane of the burners to the plane of the adjacent edge of the hearth, and such of the melted fuel ash as falls upon the floor of the furnace chamber in front of the hearth drains freely onto the hearth to mingle with the slag which forms upon the bath.

This application is substituted for my application for patent on melting furnace, Serial No. 424,362, filed November 16, 1920, and for my application for patent on furnace, Serial No. 278,595, filed February 24, 1919, allowed August 4, 1920, and renewed March 28, 1921, Serial No. 456,209, the latter of which was a division of my application for patent on apparatus for burning powdered coal, Serial No. 107,990, filed July 7, 1916, now patent No. 1,315,719, dated September 9, 1919.

In the accompanying drawings:

Fig. 1 is a central vertical longitudinal sectional view showing one form of the improved furnace;

Fig. 2 is a transverse section taken on the line 2—2 of Fig. 1;

Fig. 3 is a detail side elevation showing one form of burner which may be used with the improved furnace, the same being drawn to a larger scale than Figs. 1 and 2 and having some parts broken away to an intermediate sectional plane;

Fig. 4 is similar to a detail of Fig. 2, but shows a modified form of the masonry piers within the furnace;

Fig. 5 is similar to Fig. 1, but shows another form of the improved melting furnace with a modified form of burner and with details of the associated fuel storage and fuel feeding elements shown principally in elevation but partly in section;

Figure 8:
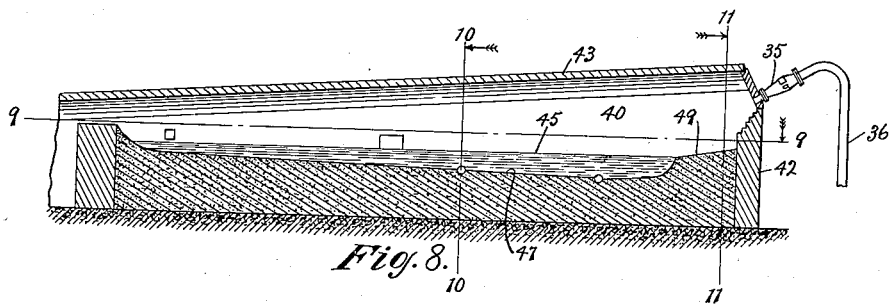
Figure 9:
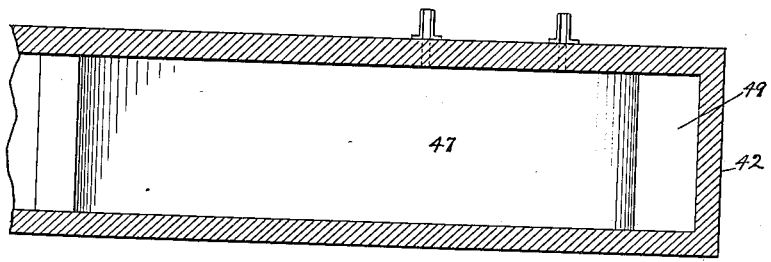
Figure 10:
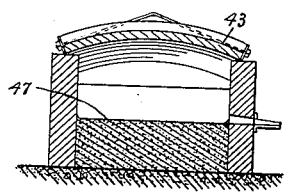
Figure 11:
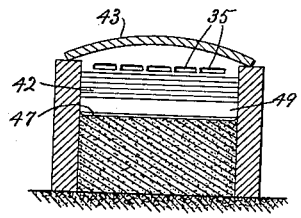

Figs. 6 and 7 are detail sectional views taken on the lines 6—6 and 7—7, respectively, of Fig. 5;

Fig. 8 is also similar to Fig. 1, but shows still another form of the improved melting furnace; and Figs. 9, 10 and 11 are sectional views taken on the lines 9—9, 10—10 and 11—11, respectively, of Fig. 8.

The furnace illustrated in Figs. 1 and 2 is constructed to provide a continuous heating and combustion chamber 15, the masonry floor of which comprises the hearth 16, and a sloping front end portion 17 which drains onto the adjacent end of the hearth. For this purpose the furnace comprises upright side walls 18, 19, front and rear end walls 20, 21, and an arching roof 22 which preferably slopes from front to rear. The burners, as 23, enter the furnace chamber 15 through the front end wall 20. As indicated in Fig. 2, these burners are arranged in a transverse horizontal row, and they are preferably sufficient in number to supply a substantially continuous sheet of flame throughout the width of the hearth 16.

The particular form of burner illustrated in Figs. 1 and 3 is that shown in my said patent No. 1,315,719, for apparatus for burning powdered coal. As the invention contemplates that the flame will be normally so directed as to impinge upon the bath adjacent the forward edge of the hearth 16, these burners are shown as being fixedly held in a downwardly and rearwardly inclined position. On the other hand, while each of the burners 23 is formed with a flaring mouth 25, within which are mounted a pair of swinging water cooled vanes, as 26, primarily intended for adjustably varying the vertical depth of the burner outlet, these vanes may also be used for changing the direction of the flame. As shown, an adjusting handle 27 is applied to one of the trunnions of each of the vanes 26 upon the outside of the burner shell, and clamping devices 28 are provided for fastening the adjusting handles 27 in any selected position throughout their range of movement.

However, it has been found in practice that when the position of the vanes 26 has once been determined, subsequent adjustment of the vanes will not be required. Furthermore, in event the burners 23 have been originally placed at the correct inclination, the most satisfactory results will usually be obtained if the vanes 26 are permanently adjusted to their most widely separated position.

While the invention also contemplates that there is preferably no obstruction in the furnace chamber 15 to interfere either with the drainage of the melted fuel ash from the sloping portion, as 17, of the floor onto the hearth, or with the free movement of the flame through the chamber from end to end, masonry piers, as 29 (Figs. 1 and 2), or 30 (Fig. 4), may be provided in the path of the flame. While these masonry piers are referred to as a bridge wall in certain of the accompanying claims, they do not, in either of the forms shown, constitute a continuous transverse baffle over which the flame must rise to enter the hearth chamber, as is customary in other furnace structures. The masonry piers 29 or 30 are, however, in each case arranged in a transverse row at the forward edge of the hearth 16. The piers 29, illustrated in Figs. 1 and 2, extend inwardly from each of the side walls of the furnace, but they are separated from each other for a substantial distance at their inner ends to provide a commodious central opening 31 extending to the floor of the furnace chamber. The piers 30, illustrated in Fig. 4, on the other hand, are sufficient in number, and of such reduced width, as to provide a series of openings 32 located at intervals throughout the width of the furnace.

In the operation of the furnace illustrated in Figs. 1, 2 and 4, each burner 23 is supplied with a combustible mixture of powdered coal held in suspension with air, preferably through a separate conduit, indicated at 24 (Fig. 1). The flame is ignited by depositing a torch consisting of a mass of burning waste, or the like, upon the inclined portion 17 of the furnace floor, and the burners are adjusted to direct the flame upon the adjacent portion of the hearth. When the masonry piers, as 29 or 30, are provided the engagement of the flame with these piers will assist in maintaining ignition while the charge of metal upon the hearth is still cold. A considerable part of the flame will, however, pass through the openings 31 or 32 between the piers, directly to the hearth.

To insure the admission of sufficient air for the complete combustion of the fuel, and to obtain a depression of the flame upon the surface of the bath throughout the length and width of the hearth, especially when the masonry piers, as 29 or 30, are used, a supplemental air supply may be admitted through the furnace roof, as through the nozzle shown at 33 in Figs. 1 and 2. This nozzle is preferably arranged to deliver air into the furnace chamber a short distance beyond the transverse plane of the masonry piers 29 or 30, and preferably in a downwardly and rearwardly inclined flat stream extending throughout the greater part of the width of the furnace. For this purpose the nozzle is relatively long and narrow, with a transversely extended outlet slit 34 entering the furnace chamber through the roof 22, and air under pressure is supplied through a blast pipe 34$^a$, shown as entering the chamber of the nozzle through one end of the same (Fig. 2).

The furnaces illustrated on sheets 2 and 3 of the drawings are each shown as being equipped with burners 35 of the type forming the subject of my pending application for patent on powdered coal apparatus, Serial No. 314,137, filed July 29, 1919. As explained in said application Serial No. 314,137, the burners herein shown at 35 serve to deliver the combustible mixture of powdered solid fuel held in suspension with air at a relatively low velocity when the conduits, as 36, supplying the burners, are of such length that the said combustible mixture should travel through the same at high velocity to prevent separation of the powdered solid fuel from the air. The term "low velocity", appearing in the accompanying claims, is accordingly used to indicate a delivery of the combustible mixture of fuel and air into the furnace at a velocity which is substantially less than that desirably maintained in long conduits to insure that uniformity in the mixture of fuel and air will not be disturbed in the travel of the mixture through the conduit.

It will, of course, be understood that where devices for securing a uniform mixture of the powdered fuel with the air are located immediately adjacent the burner, as shown, for example, in my said Patent No. 1,315,719, and here indicated at 39 (Fig. 1), delivery of the mixture to the burner at low velocity is contemplated. In that case the further delivery of the mixture into the furnace will be at the said low velocity, without special construction of the burner, as 23, to that end. When using burners of the form indicated at 35 (Figs. 5 and 8), on the other hand, the delivery of the combustible mixture into the furnace chamber at the said low velocity is accomplished by the reduction in velocity of the mixture in traveling through the burner from end to end of the same. This is due to the flaring form of the burner, whereby the cross-sectional area of the burner at its mouth (here shown in Figs. 6 and 11) is substantially greater than at the opposite end where the burner is attached to the conduit, as 36. For the successful operation of the furnace with the burners, as 23 or 35, directly entering the furnace chamber containing the hearth, the delivery of the combustible mixture of powdered solid fuel and air into the furnace chamber at the said relatively low velocity has been found to be of especial importance, particularly during the early stages of the heat.

As in the case of the burners 23, shown in Figs. 1 and 2, the burners 35 (Figs. 5, 6, 8 and 11) are arranged in a transverse horizontal row, and they enter the corresponding furnace chamber 38 (Fig. 5) or 40 (Fig. 8) through the front end wall 41 or 42 near the roof 43. Likewise the burners 35 are inclined to direct the flame upon the floor of the furnace chamber at about the point to which the metal bath 44 or 45 extends when melted, that is to say, upon the adjacent edge of the hearth 46 or 47. That part, as 48 (Fig. 5) or 49 (Figs. 8 and 9) of the floor of the furnace chamber which is in front of the hearth, as 46, or 47, slopes downwardly and rearwardly toward the hearth. Like the sloping portion 17 of the floor of the furnace chamber 15 (Fig. 1) this part of the furnace floor is of such length as to provide a combustion space or heating chamber between the burners and the hearth sufficient to insure a proper condition of the flame where it impinges upon the bath or hearth.

The sloping portion, as 48 or 49, of the floor of the furnace chambers 38 and 40, illustrated in Figs. 5 and 8, also corresponds with the sloping end portion 17 of the floor of the furnace chamber 15 illustrated in Fig. 1, in that it drains freely onto the hearth or bath and normally provides an exposed masonry surface to assist in maintaining ignition of the flame.

It will thus be seen that the furnaces illustrated on sheets II and III of the drawings differ from that illustrated on sheet I only in the omission of the masonry piers shown at 29 and 30 in Figs. 1, 2 and 4, in the omission of the nozzle 33 for the introduction of a supplemental air supply through the furnace roof, and in the use of a different form of burner. As already pointed out, however, this last mentioned difference arises from the location of mixing devices, indicated at 39, immediately adjacent the burner 23 in Fig. 1, and the use of a relatively long conduit, as 36, for delivering the mixture of powdered solid fuel and air to the burner, as 35, in Figs. 5 and 8.

The particular form of apparatus for delivering powdered coal and air to the conduit 36 (Figs. 5 and 8) forms no part of the present invention. Fig. 5 shows one of the conduits 36 extending from the carbureter 50 of powdered coal apparatus of the kind forming the subject of my pending application for patent Serial No. 314,136, filed July 29, 1919. This apparatus includes a fuel hopper 51, a feed screw 52, and means 54 for furnishing an air blast. The feed screw 52 operates in one of a plurality of like compartments at the bottom of the hopper 51, and both the feed screw 52 and the blast means 54 deliver to the carbureter 50. There are also regulating devices 55 and 56 for changing the speed of the feed screw 52, and for varying the volume of the air delivered by the blast means 54. These devices make it possible to regulate both the intensity and the character of the flame.

At the beginning of the operation the cold metal constituting the charge is heaped upon the hearth, as 16, 46, or 47, thereby leaving a part of the refractory surface of the hearth directly exposed to the flame.

During the early stages of the heat the flame accordingly sweeps through the heap of cold material immediately adjacent the hearth. The material forming the base or lower portion of the heap is thus melted first, and the material originally contained in the upper part of the heap gradually sinks into the melted bath upon which the flame is directly impinging. The formation of a molten bath about a relatively cold, and therefore solid or pasty mass of material, which, being submerged in the bath, would thereafter be melted with difficulty, is thereby avoided.

When the charge is melted the ash from the flame mixes with the slag floating on the bath, and sufficient circulation within the bath to insure the entire mass of material being quickly brought to the desired temperature is maintained by the manner in which the flame impinges upon the path. There is accordingly a saving in both the amount of time and the quantity of fuel required for a "heat," and the oxidation loss is reduced both because of the shorter duration of the exposure of the metal while in a heated condition and because of the improved character of the flame. When air under pressure is introduced through the nozzle 33 the proportion of air introduced through the burner as 23, may be reduced.

I claim as my invention—

1. In a furnace, in combination, a heating chamber and hearth therefor, a combustion chamber, a floor for the combustion chamber which is above the level of and adapted to drain freely onto the hearth of the heating chamber, and a jet burner for introducing comminuted solid fuel held in suspension with air into the said combustion chamber.

2. In combination with a furnace having a hearth, an end wall in front of the hearth but spaced apart therefrom to provide a combustion chamber between the said end wall and the front end of the hearth, an exposed masonry floor for said combustion chamber and a roof extending over the combustion chamber and hearth, of a jet burner for powdered fuel entering the furnace through its said end wall and directed over the hearth through the said combustion chamber, means for varying the direction of the flame of said burner angularly in a vertical plane, and means for introducing a supplemental stream of air under pressure immediately under the furnace roof adjacent the front end of the hearth.

3. In combination with a furnace having a hearth, a bridge wall at the front end of the hearth, an end wall in front of the bridge wall but spaced apart therefrom to provide a combustion chamber between the said end wall and bridge wall, a masonry floor for said combustion chamber, and a roof extending over the combustion chamber and hearth, of a jet burner for powdered fuel entering the furnace through its said end wall, means for varying the direction of the flame of said burner at will so that it shall play upon said floor, upon the bridge wall or over the bridge wall into the space above the hearth, and means for introducing a supplemental stream of air immediately under the furnace roof adjacent the front end of the hearth.

4. In combination with a furnace having a hearth, an end wall in front of the hearth but spaced apart therefrom to provide a combustion chamber between the said end wall and the front end of the hearth and a roof extending over the combustion chamber and hearth, of an angularly adjustable jet burner for powdered fuel entering the furnace through its said end wall, the adjustment of the burner permitting the flame to be directed downwardly upon the floor of the combustion chamber in front of the hearth or rearwardly over the hearth through the said combustion chamber, and means for introducing a supplemental stream of air immediately under the furnace roof adjacent the front end of the hearth.

5. In combination with a furnace having a hearth, a bridge wall at the front end of the hearth, an end wall in front of the bridge wall but spaced apart therefrom to provide a combustion chamber between the said end wall and bridge wall, and a roof extending over the combustion chamber and hearth, of an angularly adjustable jet burner for powdered fuel entering the furnace through its said end wall, the adjustment of the burner permitting the flame to be directed downwardly upon the floor of the combustion chamber in front of the bridge wall or rearwardly over the bridge wall and hearth through the combustion chamber, and means for introducing a supplemental stream of air immediately under the furnace roof adjacent the front end of the hearth.

6. A furnace comprising a combustion chamber having a masonry floor, a hearth, a bridge wall between the floor and hearth, a jet burner for powdered fuel entering the combustion chamber, means to vary the direction of flame from said burner angularly in a vertical plane so as to direct it toward the floor toward the bridge wall or over the hearth, means to introduce a forcible flame depressing blast through the roof of the furnace adjacent the bridge wall whereby the flame will be forced down into contact with material on said hearth.

7. In a furnace, in combination, a combustion chamber, a jet burner for introducing comminuted solid fuel held in suspension with air into the combustion chamber, a heating chamber, a depressed hearth for the heating chamber, and a floor for the combustion chamber raised above and sloping toward the hearth, the depressed hearth dipping abruptly from the lower end of the floor of the combustion chamber, whereby the said floor is always clear of the bath held on the hearth and drains freely onto the surface of the bath.

8. In a powdered coal apparatus, in combination, a furnace having combustion and heating chamber, a hearth for the heating chamber of the furnace, and a masonry floor for the combustion chamber of the furnace which is above the level of the said hearth and forms an extension of and freely drains onto the same, a jet burner entering the combustion chamber of the furnace, and means for delivering a blast of air and comminuted solid fuel to the burner.

9. In a melting furnace, in combination, an uninterrupted combustion and heating chamber having a relatively long shallow hearth to receive the heaped charge while in the solid state and to contain the bath when melted, and a burner for introducing comminuted solid fuel held in suspension with air at atmospheric temperature directly entering the said chamber above the hearth at one end and directed obliquely downward and inward upon the hearth whereby the flame sweeps through the base of the charge while in the solid state and impinges upon the adjacent margin of the bath when melted and the melted fuel ash falls upon the hearth or charge and mixes with the slag which forms upon the bath.

10. In a melting furnace, in combination, an uninterrupted combustion and heating chamber having a relatively long shallow hearth to receive the heaped charge while in the solid state and to contain the bath when melted, and a low velocity burner for introducing comminuted solid fuel held in suspension with air directly entering the said chamber above the hearth at one end and directed obliquely downward and inward upon the hearth whereby the flame sweeps through the base of the charge while in the solid state and impinges upon the adjacent margin of the bath when melted and the melted fuel ash falls upon the hearth or charge and mixes with the slag which forms upon the bath.

11. In a melting furnace, in combination, an uninterrupted combustion and heating chamber having a relatively long shallow hearth to receive the heaped charge while in the solid state and to contain the bath when melted, and a series of separate burners for introducing comminuted solid fuel held in suspension with air at atmospheric temperature directly entering the said chamber above the hearth at one end, the said burners being arranged in a transverse horizontal row and all directed obliquely downward and inward upon the hearth whereby the flame sweeps through the base of the charge while in the solid state and impinges upon the adjacent margin of the bath when melted and the melted fuel ash falls upon the hearth or charge and mixes with the slag which forms upon the bath.

12. In a melting furnace, in combination, an uninterrupted combustion and heating chamber having a relatively long shallow hearth to receive the heaped charge while in the solid state and to contain the bath when melted, and a series of separate low velocity burners for introducing comminuted solid fuel held in suspension with air directly entering the said chamber above the hearth at one end, the said burners being arranged in a transverse horizontal row and all directed obliquely downward and inward upon the hearth whereby the flame sweeps through the base of the charge while in the solid state and impinges upon the adjacent margin of the bath when melted and the melted fuel ash falls upon the hearth or charge and mixes with the slag which forms upon the bath.

13. The method of melting iron which consists in heaping a charge of the cold solid material upon a relatively long and shallow enclosed refractory hearth, depositing ignited material upon the hearth, and thereafter continuously introducing a combustible mixture of comminuted solid fuel with air at atmospheric temperature directly into the hearth chamber at one end of the same, the said mixture being directed obliquely downward and inward with respect to the hearth whereby the flame resulting from the original ignition of the mixture from the torch is continued by contact with the refractory surface of the hearth and sweeps through the base of the charge while the charge is in the solid state and impinges upon the adjacent margin of the bath when melted and the melted fuel ash falls upon the hearth or charge and mixes with the slag which forms upon the bath.

14. In a furnace, in combination, a heating chamber, a combustion chamber, a bridge wall located between said chambers provided with an opening extending to the bottom of the wall for drainage from one of said chambers to the other, and a jet burner for introducing comminuted solid fuel held in suspension with air into the said combustion chamber.

15. A furnace comprising a heating chamber, a combustion chamber, a bridge wall provided with a drainage opening, a jet burner for introducing comminuted solid fuel held in suspension with air to said combustion chamber, and means for directing the jet of fuel, so as to impinge upon the floor of said combustion chamber, upon said bridge wall or into said heating chamber.

16. A furnace, as recited in claim 15, and a supplementary air supply means in the roof of the heating chamber.

17. In combination, a furnace having combustion and heating chambers, a hearth for the heating chamber of the furnace, and a masonry floor for the combustion chamber of the furnace which is above the level of the said hearth, a jet burner for powdered fuel entering the combustion chamber of the furnace and the masonry bridge wall located between the hearth and the masonry floor of the combustion chamber, the said bridge wall being constructed with drain openings for slag extending through the same from the masonry floor of the combustion chamber to the hearth.

18. In combination, a furnace having combustion and heating chambers, a hearth for the heating chamber of the furnace and a masonry floor for the combustion chamber of the furnace which is above the level of the said hearth, a jet burner for powdered fuel entering the combustion chamber of the furnace, and a series of separated upright piers arranged transversely of the furnace between the hearth and the masonry floor of the combustion chamber, the openings between the piers serving as passages for drainage of slag from the masonry floor of the combustion chamber onto the hearth.

AUBREY J. GRINDLE.